(12) United States Patent
Ba-Tis et al.

(10) Patent No.: US 10,893,200 B2
(45) Date of Patent: Jan. 12, 2021

(54) AUTOFOCUS AND OPTICAL IMAGE STABILIZER SYSTEM

(71) Applicants: Faez Ba-Tis, Toronto (CA); Ridha Ben-Mrad, Toronto (CA)

(72) Inventors: Faez Ba-Tis, Toronto (CA); Ridha Ben-Mrad, Toronto (CA)

( * ) Notice: Subject to any disclaimer, the term of this patent is extended or adjusted under 35 U.S.C. 154(b) by 0 days.

(21) Appl. No.: 16/413,754

(22) Filed: May 16, 2019

(65) Prior Publication Data
US 2019/0373174 A1 Dec. 5, 2019

Related U.S. Application Data

(60) Provisional application No. 62/679,234, filed on Jun. 1, 2018.

(51) Int. Cl.
| | | |
|---|---|---|
| H04N 5/232 | (2006.01) | |
| G02B 27/64 | (2006.01) | |
| G03B 5/06 | (2006.01) | |
| G03B 13/36 | (2006.01) | |

(52) U.S. Cl.
CPC ....... *H04N 5/23287* (2013.01); *G02B 27/646* (2013.01); *G03B 5/06* (2013.01); *G03B 13/36* (2013.01); *G03B 2205/0023* (2013.01); *G03B 2205/0084* (2013.01)

(58) Field of Classification Search
CPC ...... H04N 5/23287; G03B 5/06; G03B 13/36; G03B 2205/0023; G03B 2205/0084; G02B 27/646
See application file for complete search history.

(56) References Cited

U.S. PATENT DOCUMENTS

| | | | | |
|---|---|---|---|---|
| 9,306,475 B1* | 4/2016 | Ba-Tis | ................ | H02N 1/006 |
| 9,813,602 B2* | 11/2017 | Ba-Tis | ................ | H04N 5/2253 |
| 10,122,924 B2* | 11/2018 | Ba-Tis | ............... | H04N 5/23287 |
| 10,241,129 B1* | 3/2019 | Ba-Tis | ................ | G01P 15/125 |
| 2014/0092493 A1* | 4/2014 | Topliss | ................ | G02B 7/08 |
| | | | | 359/824 |
| 2014/0099088 A1* | 4/2014 | Katano | ................ | G02B 7/102 |
| | | | | 396/55 |
| 2014/0362243 A1* | 12/2014 | Han | ................ | G03B 3/10 |
| | | | | 348/208.12 |
| 2015/0160426 A1* | 6/2015 | Chao | ................ | G02B 7/08 |
| | | | | 359/824 |
| 2015/0350499 A1* | 12/2015 | Topliss | ................ | H04N 5/2253 |
| | | | | 348/373 |
| 2015/0350500 A1* | 12/2015 | Gutierrez | ............ | H04N 5/2253 |
| | | | | 348/374 |

(Continued)

*Primary Examiner* — Timothy J Henn
(74) *Attorney, Agent, or Firm* — Nasser Ashgriz; UIPatent Inc.

(57) ABSTRACT

The present invention is a mechanism to achieve autofocus (AF) and optical image stabilization (OIS) to counteract hand-shake by tilting the lens and the image sensor simultaneously such that no vignetting effect is introduced to the image. The present invention removes the blur or distortion (vignetting effect) by incorporating an actuator beneath the image sensor to tilt the image sensor in conjunction with the lens barrel tilt to achieve OIS. Such simultaneous and coordinated tilting to the optical elements in the camera (lens barrel and image sensor) guarantees that the plane of the reflected image and the plane of the image sensor are both parallel, and aberrations free images are constructed.

4 Claims, 12 Drawing Sheets

(56) References Cited

U.S. PATENT DOCUMENTS

| | | | |
|---|---|---|---|
| 2016/0109720 A1* | 4/2016 | Hu | G02B 27/646 |
| | | | 359/557 |
| 2016/0119517 A1* | 4/2016 | Topliss | H04N 5/2253 |
| | | | 348/374 |
| 2016/0190958 A1* | 6/2016 | Gutierrez | B81B 7/008 |
| | | | 318/116 |
| 2016/0212332 A1* | 7/2016 | Tang | G02B 26/0875 |
| 2016/0216527 A1* | 7/2016 | Juhola | G03B 3/10 |
| 2016/0234422 A1* | 8/2016 | Inata | H04N 5/2253 |
| 2017/0366103 A1* | 12/2017 | Ba-Tis | H02N 1/002 |
| 2018/0048793 A1* | 2/2018 | Gross | G02B 7/005 |
| 2018/0213154 A1* | 7/2018 | Ba-Tis | H04N 5/23287 |

* cited by examiner

| | |
|---|---|
| 11 | object in the scene along the optical axis |
| 12 | lens barrel |
| 13 | image sensor |
| 14 | optical axis |
| 15 | initial position of the reflected image of the object on the image sensor |
| 16 | reflected image plane |
| 17 | object image before the OIS correction |
| 18 | object image after the OIS correction |
| 19 | Rotation of the hand shake tilt |
| 20 | OIS compensation tilt |

| 11 | object in the scene along the optical axis |
|---|---|
| 12 | lens barrel |
| 13 | image sensor |
| 14 | optical axis |
| 15 | initial position of the reflected image of the object on the image sensor |
| 16 | reflected image plane |
| 18 | object image |

| 11 | object in the scene along the optical axis |
| 12 | lens barrel |
| 13 | image sensor |
| 14 | optical axis |
| 15 | initial position of the reflected image of the object on the image sensor |
| 16 | reflected image plane |
| 18 | object image |

| | |
|---|---|
| 11 | object in the scene along the optical axis |
| 12 | lens barrel |
| 13 | image sensor |
| 14 | optical axis |
| 15 | initial position of the reflected image of the object on the image sensor |
| 16 | reflected image plane |
| 17 | object image before the OIS correction |
| 18 | object image after the OIS correction |
| 19 | Direction of the hand shake tilt |
| 20 | OIS compensation tilt |
| 21 | image sensor plane |

| | |
|---|---|
| 11 | object in the scene along the optical axis |
| 12 | lens barrel |
| 13 | image sensor |
| 14 | optical axis |
| 15 | initial position of the reflected image of the object on the image sensor |
| 16 | reflected image plane |
| 17 | object image before the OIS correction |
| 18 | object image after the OIS correction |
| 19 | Direction of the hand shake tilt |
| 20 | OIS compensation tilt |

| 100 | OIS and AF camera module |
|---|---|
| 110 | lens barrel |
| 120 | image sensor |
| 130 | flex/PCB board |
| 140 | camera housing |
| 150 | IR filter |
| 200 | Lens barrel actuator |
| 210 | lens barrel actuator stator |
| 220 | lens barrel actuator rotor |
| 300 | image sensor actuator |
| 310 | image sensor actuator stator |
| 320 | image sensor actuator rotor |

| 100 | OIS and AF camera module |
| 110 | lens barrel |
| 120 | image sensor |
| 130 | flex/PCB board |
| 140 | camera housing |
| 200 | Lens barrel actuator |
| 210 | lens barrel actuator stator |
| 220 | lens barrel actuator rotor |
| 300 | image sensor actuator |
| 310 | image sensor actuator stator |
| 320 | image sensor actuator rotor |

| | |
|---|---|
| 200 | Lens barrel actuator |
| 210 | lens barrel actuator stator |
| 220 | lens barrel actuator rotor |
| 300 | image sensor actuator |
| 310 | image sensor actuator stator |
| 320 | image sensor actuator rotor |
| 350 | reflected Image plane |
| 320 | image sensor plane |

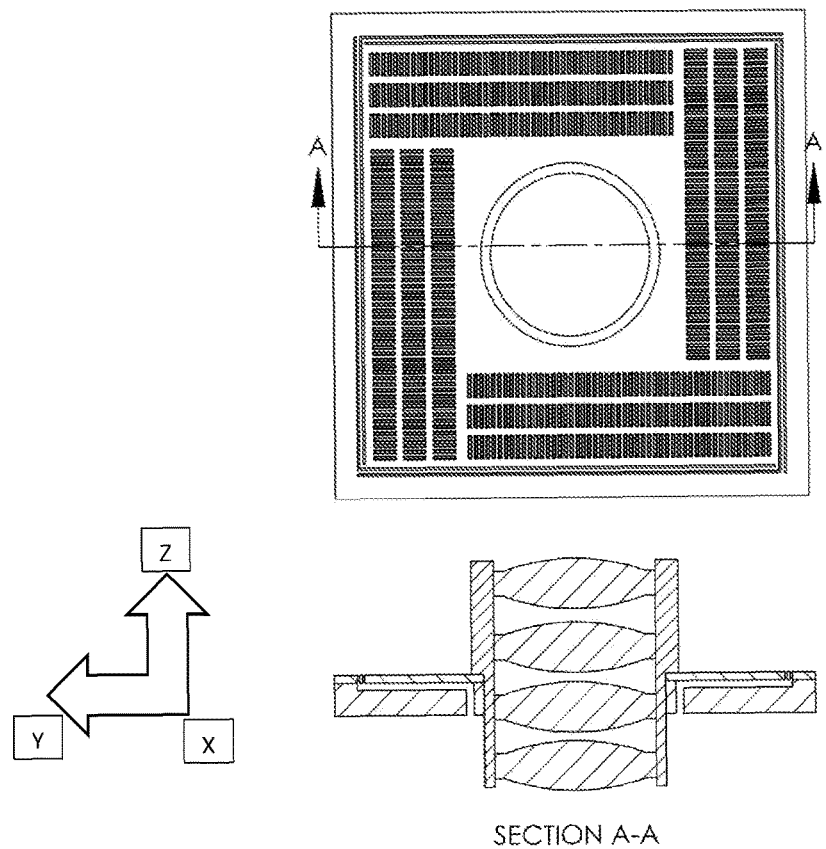
FIG. 3B
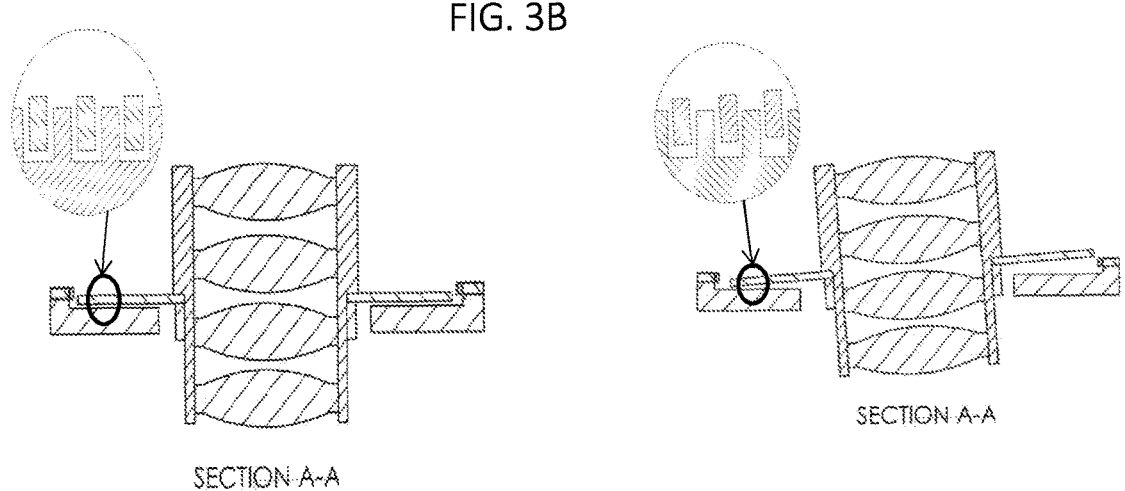
During translation along the Z-axis    FIG. 3C    During rotation about the x-axis

AUTOFOCUS AND OPTICAL IMAGE STABILIZER SYSTEM

RELATED APPLICATIONS

This application claims priority to the U.S. provisional patent application No. 62/679,234, filed Jun. 1, 2018, entitled "Optical Image Stabilizer System", the application being hereby incorporated by reference in its entirety.

FIELD OF THE INVENTION

The invention relates to the field of Auto Focus (AF) and optical image stabilization (OIS) systems that utilizes micro actuators to move optical and sensing elements to compensate for hand-shake blur and achieve autofocus. The novel mechanism of achieving AF and OIS is used in cameras that are integrated in a variety of electronic devices such as smartphones, iPads, laptops, and other electronic devices that require miniature camera modules for imaging.

BACKGROUND OF THE INVENTION

Different mechanisms to achieve Optical Image Stabilization (OIS) in cameras have been developed to remove hand-shake effect on the image or video. These methods include lens barrel shift, image sensor shift, only lens barrel tilt, or the entire camera tilt. The lens barrel and image sensor shift along the x-y plane, which is perpendicular to the optical axis (z-axis), easily distorts the image, especially around the edges. The entire camera tilt mechanism, disclosed in U.S. Pat. No. 8,866,918 B2, requires a large actuation unit that surrounds the whole camera and it consumes high powers due to the large pay-load (entire camera) to achieve OIS.

Only-Lens tilt mechanism has also been used to counteract the hand-shake distortion by tilting the lens barrel about the x-y axes. Such mechanism is disclosed in the following patents and patent applications: U.S. Pat. No. 9,602,726B2, U.S. Pat. Nos. 9,329,356, 7,725,014, 8,982,464. All of the designs presented in these patents achieve OIS by tilting the lenses only. Such tilting introduces significant distortion to the image called vignetting effect (an effect that shows part of the image in focus while other parts are out of focus, especially at the edges). This is due to the fact that when the lenses are tilted, the reflected image plane is also tilted and it becomes not parallel to the sensor plane. Such drawback has prevented the lens tilt mechanism from being widely used in cameras as the quality of the image is compromised.

SUMMARY OF THE INVENTION

The present invention is a mechanism to achieve OIS to counteract hand-shake by tilting the lens and the image sensor simultaneously such that no vignetting effect is introduced to the image. The system also achieves AF by moving the image sensor and/or the lens barrel along the optical axis. By using the two actuators for AF, the achievable stroke available for AF is the sum of that of each of the two actuators when such a stroke is not used for OIS compensation.

An example of actuators to achieve such mechanism are disclosed in previous inventions by the inventors presented in the U.S. patent application Ser. No. 15/413,213 and the U.S. Pat. No. 9,813,602 B2, which are incorporated by reference herein.

The previous inventions only disclose camera modules utilizing MEMS electrostatic actuators to achieve OIS by tiling only the lens barrel. However, a blur to the image is inevitable using such a technique. The present invention removes the blur or distortion (vignetting effect) by incorporating an actuator beneath the image sensor to tilt the image sensor in conjunction with the lens barrel tilt to achieve OIS. Such simultaneous and coordinated tilting to the optical elements in the camera (lens barrel and image sensor) guarantees that the plane of the reflected image and the plane of the image sensor are both parallel, and aberrations free images are constructed.

The MEMS electrostatic actuator that actuates the lens barrel, disclosed in the U.S. patent application Ser. No. 15/413,213, has 3 degrees-of-freedom motions (translation along the optical axis z, and bi-axial tilt about the x and y axes). The actuator is designed to fit and receive a lens barrel that is placed with the actuator central opening. The translation is used to achieve AF and the bi-axial tilt is used to achieve OIS.

The MEMS electrostatic actuator that actuates the image sensor, disclosed in U.S. Pat. No. 9,813,602B2, has 3 degrees-of-freedom motions (translation along the optical axis z, and bi-axial tilt about the x and y axes), but it was used to only achieve AF through translation of the image sensor along the z-axis (i.e., optical axis).

The present invention utilizes the three-degrees-of-freedom motion of each actuator to achieve an optimal AF and OIS system that corrects hand-shake blur by dual tilt of the lens barrel and the image sensor such that no vignetting effect is introduced to the image. The system is also able to achieve AF by translating the lens barrel and the image sensor along the z-axis.

U.S. Pat. No. 9,813,602 B2 by the same inventors, disclosed an autofocus mechanism, using an actuator that provides 3 degrees-of-freedom motion: translation along the optical axis (i.e. z axis) and bi-axial tilt about the in-plane x and y axes. The bi-axial tilt is used to cancel any undesired lens tilt due to imperfections in the lens barrel assembly and any tilt that occurs during the use of the camera module. The main features that enables the piston-tube actuator to meet the requirements of such autofocus mechanism (i.e. image sensor actuation) include the ability of bonding and packaging the MEMS silicon chips with the image sensors, the high reliability of the springs of the actuator based on the springs having a large width and a large height, the large length of the springs, and the ultra-thin height of the actuator.

BRIEF DESCRIPTION OF DRAWINGS

Embodiments herein will hereinafter be described in conjunction with the appended drawings provided to illustrate and not to limit the scope of the claims, wherein like designations denote like elements, and in which:

FIG. 3B shows top and cross-sectional views of the lens barrel actuator.

FIG. 3C shows cross-sectional views of the lens barrel actuator while the actuator is in translation and in tilt motions.

DETAILED DESCRIPTION OF THE INVENTIONS

Figure 1A:
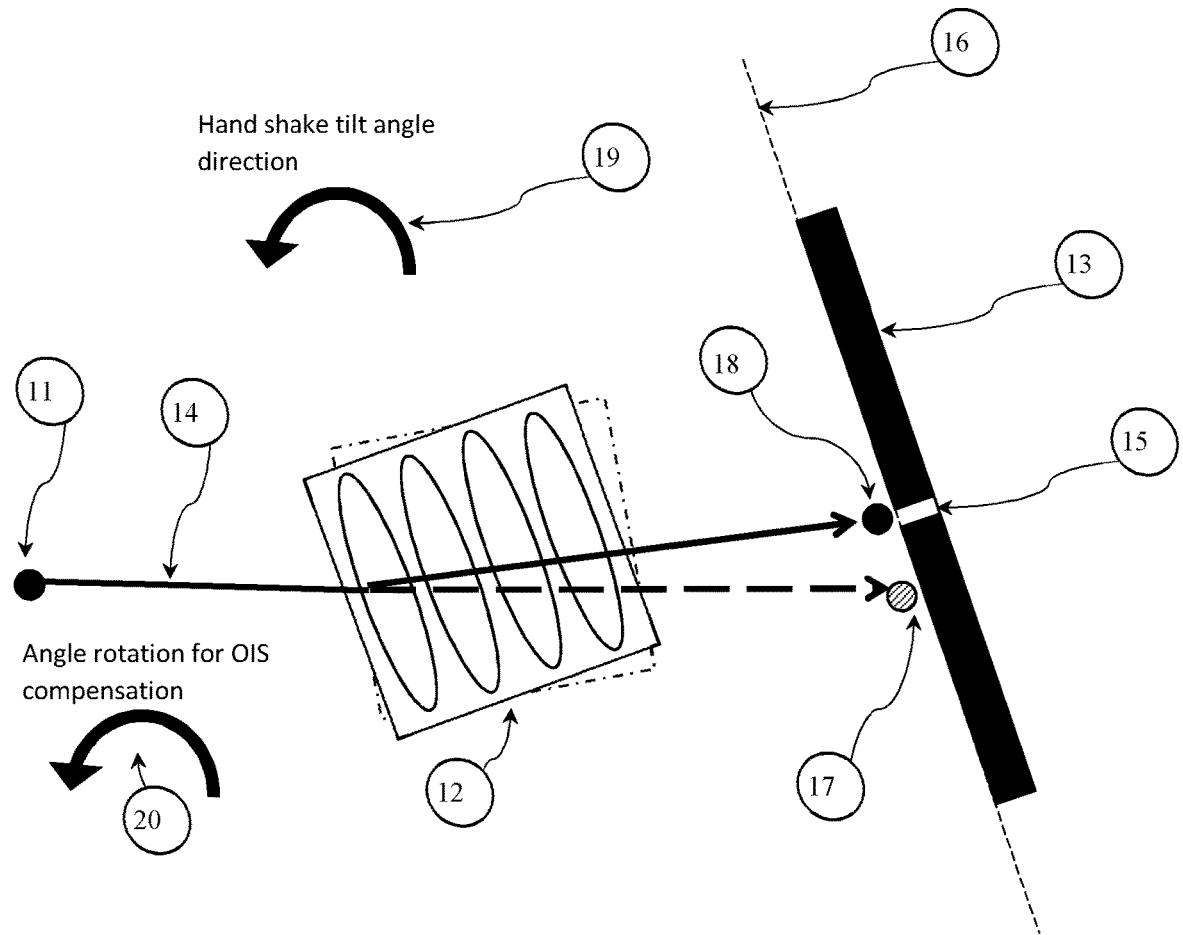
FIG. 1A shows schematics of the optical system of the camera after OIS compensation using lens and image sensor dual tilt mechanism.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

The present invention presents a novel method for achieving AF and OIS compensation using tilt of both lens barrel and image sensor separately. Such method removes any blur that ensues from tilting the lens barrel by making the plane of the image sensor and the plane of the reflected image aligned.

Figure 1B:
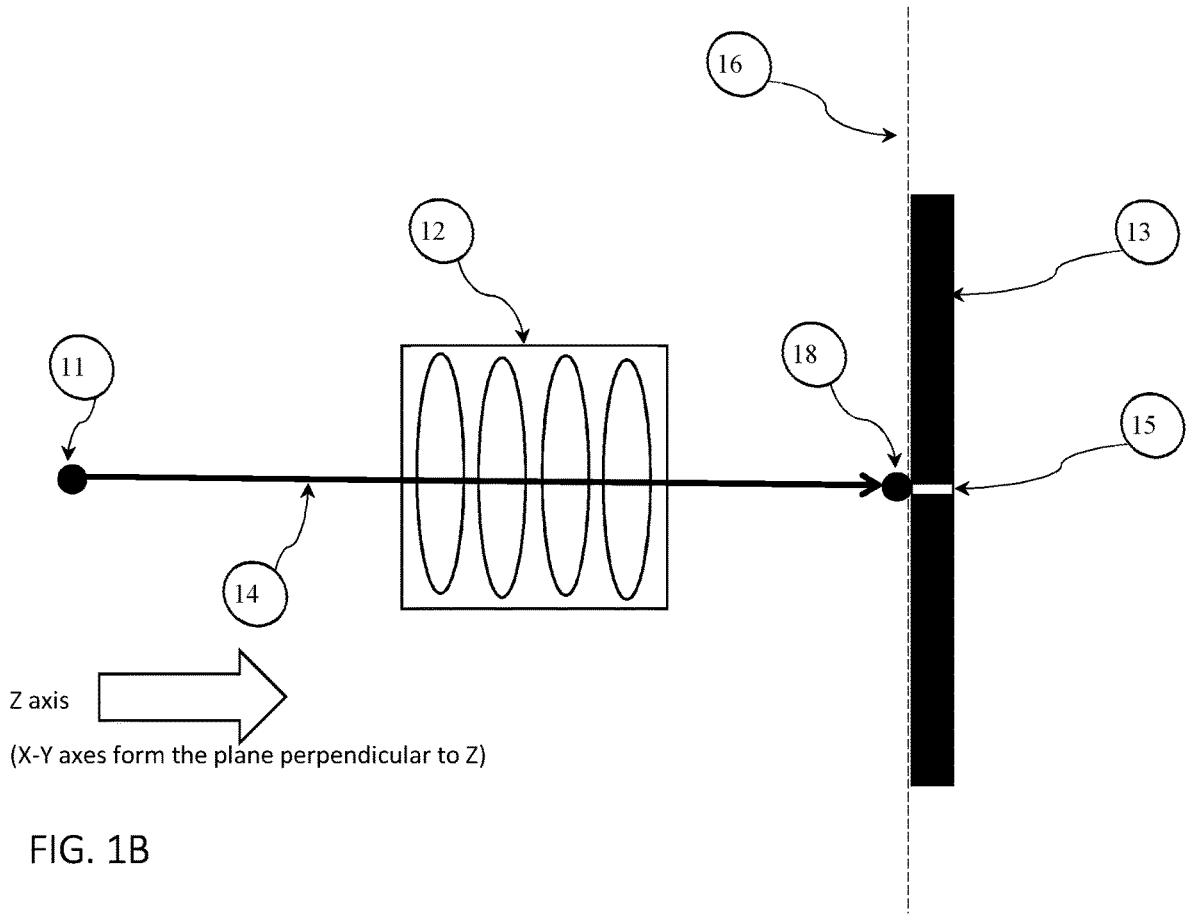
FIG. 1B shows schematics of the optical system of the camera before hand shake tilt is introduced.

FIG. 1A shows the complete OIS and AF system once the compensation is achieved. To explain the novel method in the present invention, FIG. 1B shows the schematics of the optical system of the camera before any hand-shake tilt is introduced. The reflected image 18 of the object 11 along the optical axis 14 is at its initial position 15 on the image sensor 13.

Figure 1C:
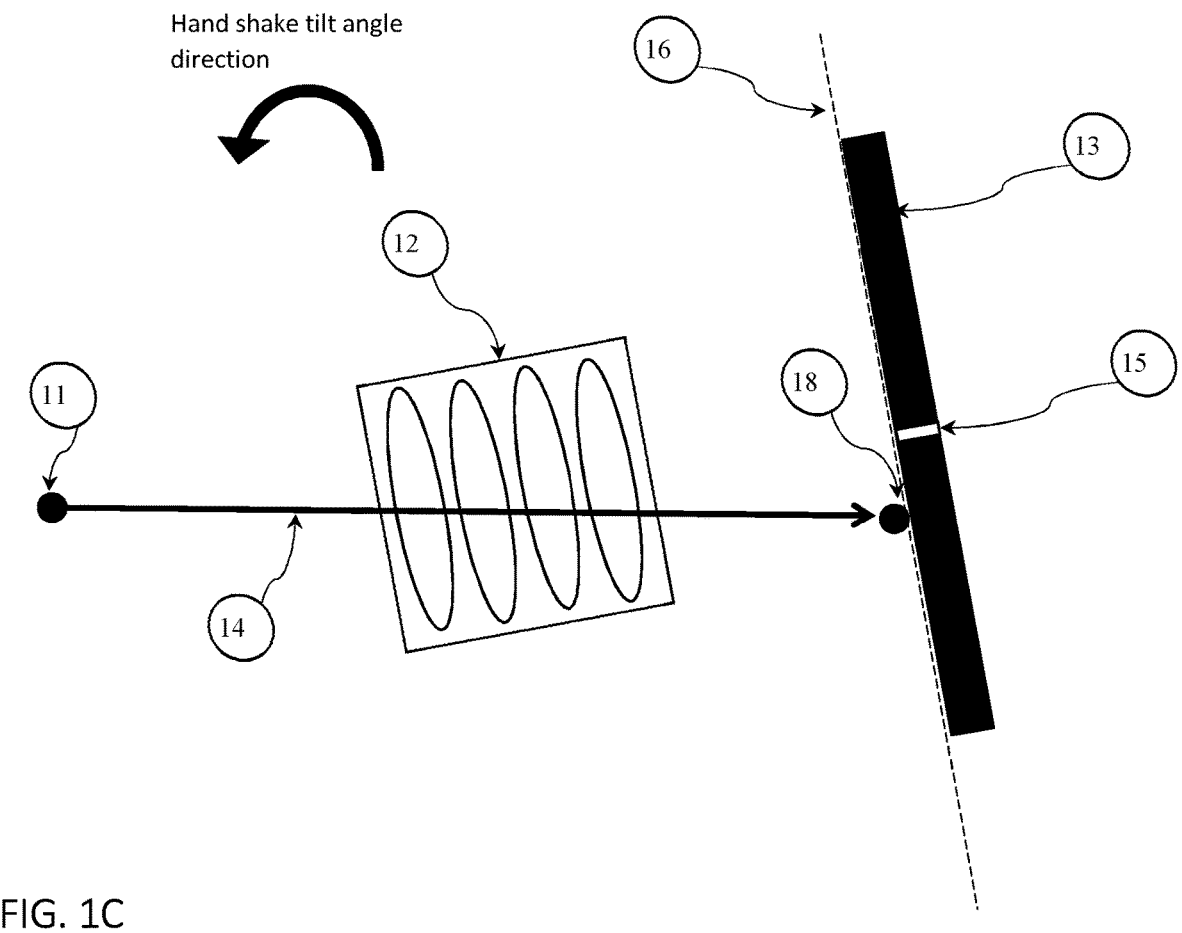
FIG. 1C shows schematics of the optical system of the camera after hand shake tilt is introduced, where the reflected image of the object is shifted down.

When the entire camera is tilted downward, refer to FIG. 1C, due to the hand-shake tilt 19 (pitch or yaw motions), the reflected image of the object on the image sensor is shifted downward, hence blur is introduced.

Figure 1D:
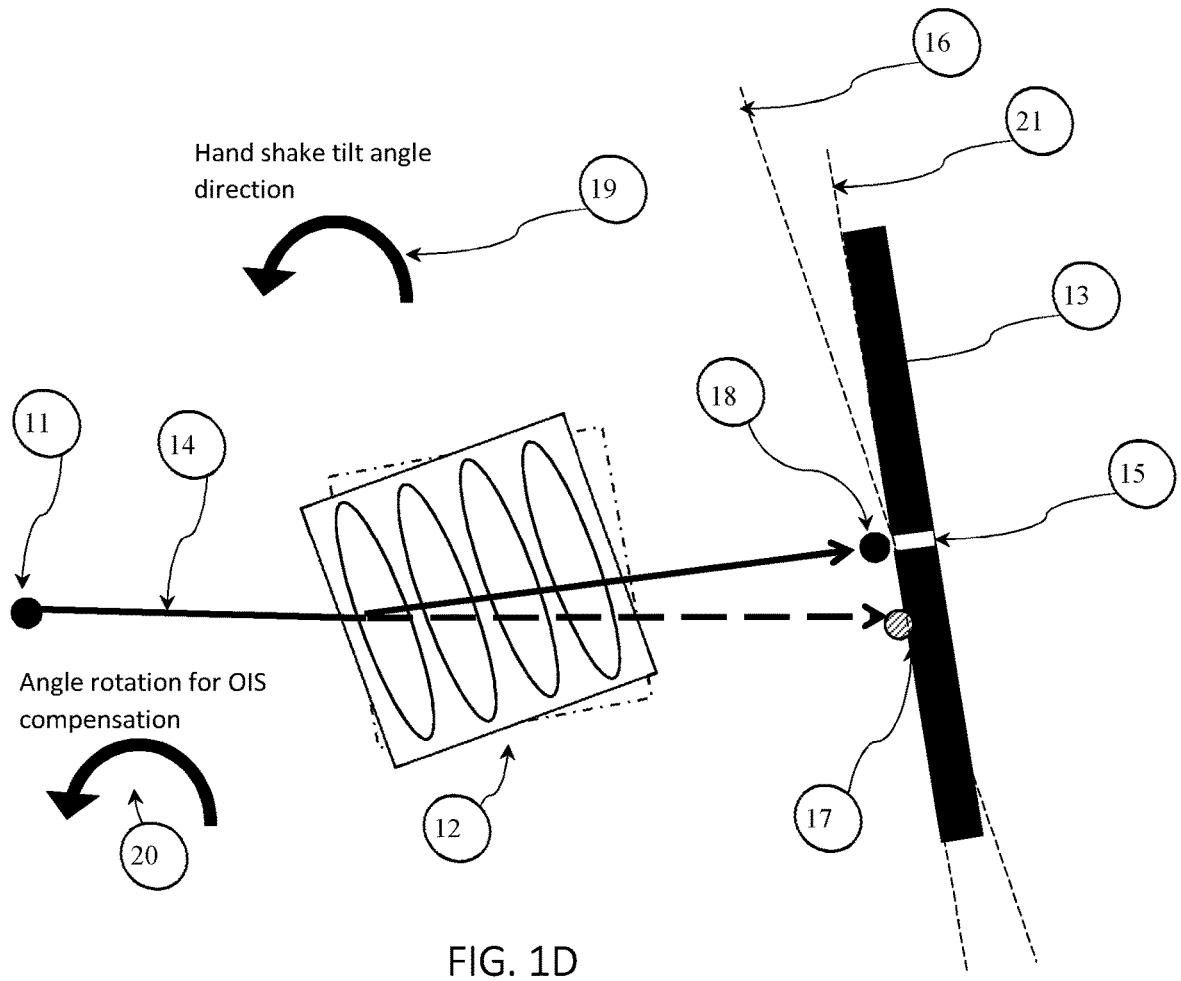
FIG. 1D shows schematics of the optical system of the camera after hand shake tilt is introduced, and only the lens barrel is tilted for OIS compensation, while the image sensor still not tilted.

To correct for such blur, the image 17 of the object has to return to its initial position 15 on the image sensor. To do so, an actuator has to tilt the lens barrel in the direction 20 of the hand-shake tilt in order to shift the reflected image of the object up and restore its initial position on the image sensor, refer to FIG. 1D. The object image 18 is then restored, but another blur is introduced to the image as the edges of the image are out of focus. This is due to the fact that, the plane 16 of the reflected image which passes through the lens barrel 12 is not aligned with the image sensor plane 21.

Figure 1E:
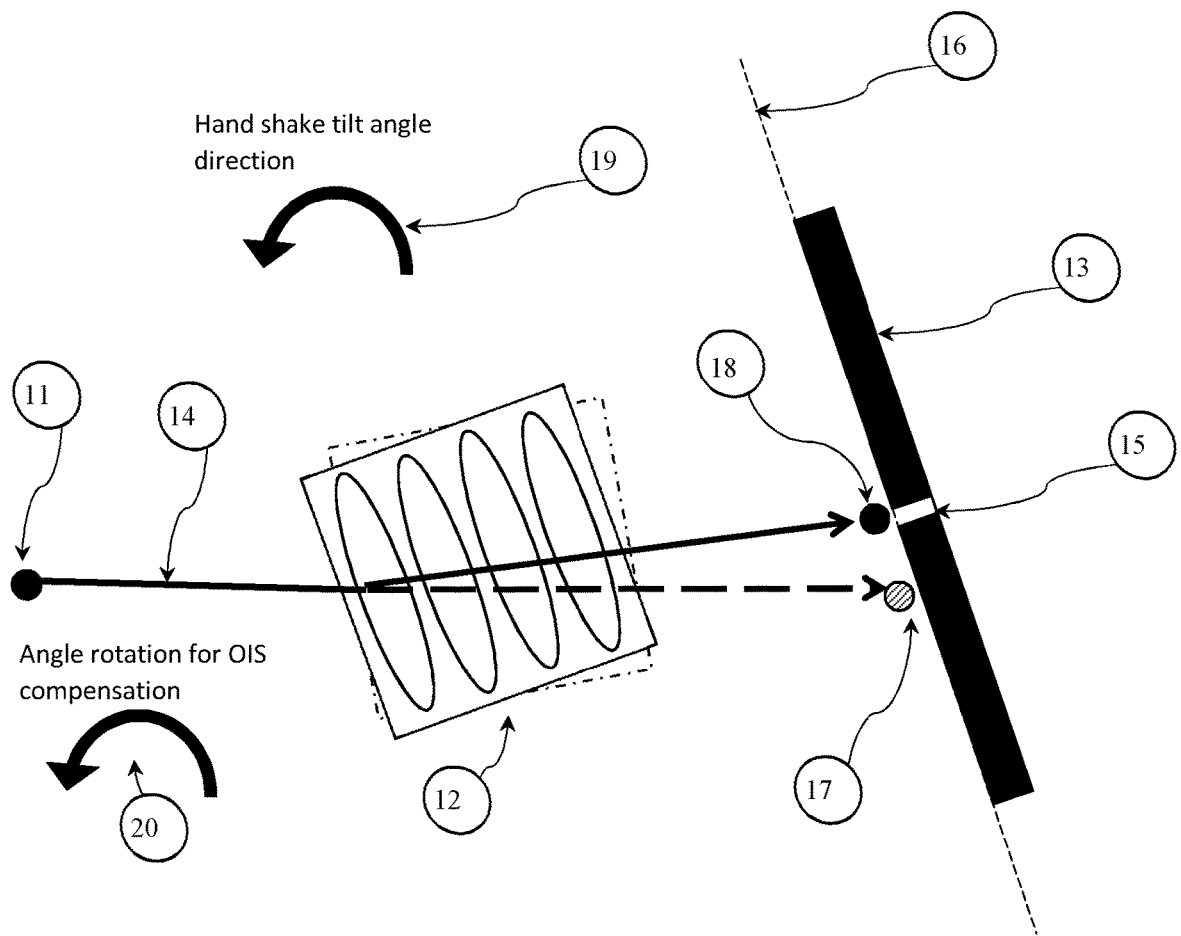
FIG. 1E shows schematics of the optical system of the camera after hand shake tilt is introduced, and both of the lens barrel and image sensor are tilted for OIS compensation.

To correct for this blur (i.e. a vignetting effect where edges of the image are out of focus), another actuator placed beneath the image sensor has to tilt the image sensor in the direction 20 of the lens barrel actuator tilt in order to make the image sensor plane 21 parallel to the reflected image plane 16. FIG. 1E shows the image stabilization system after the corrections of the hand-shake and vignetting blurs are achieved.

It should be apparent that such method is distinct from the entire camera tilt mechanism. The entire camera tilt mechanism compensates for OIS by tilting the entire camera in an opposite direction to the hand-shake tilt, where the method presented here compensates for it by tilting the lens barrel and image sensor, separately, in the direction so as to restore the focus of the image and to remove the vignetting effect.

Figure 2A:
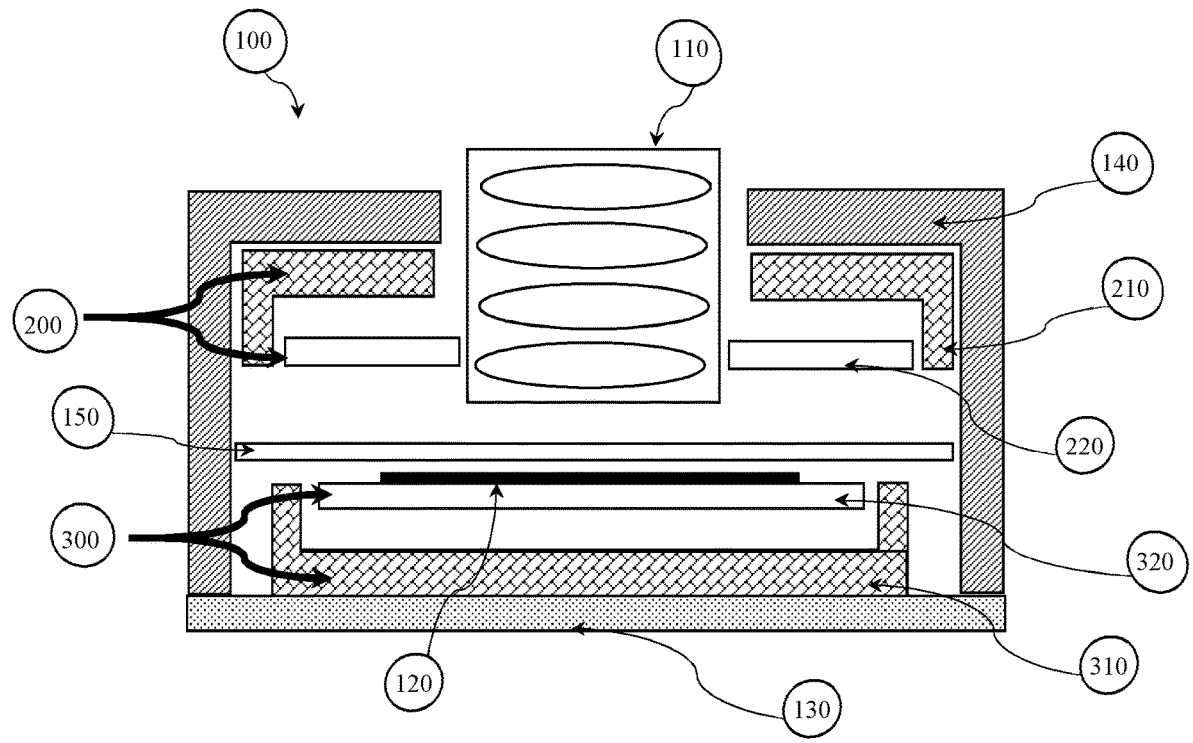
FIG. 2A shows a cross-sectional view of the OIS and AF camera system where two micro actuators are integrated around the lens barrel and the image sensor to achieve OIS and/or AF features.
Figure 2B:
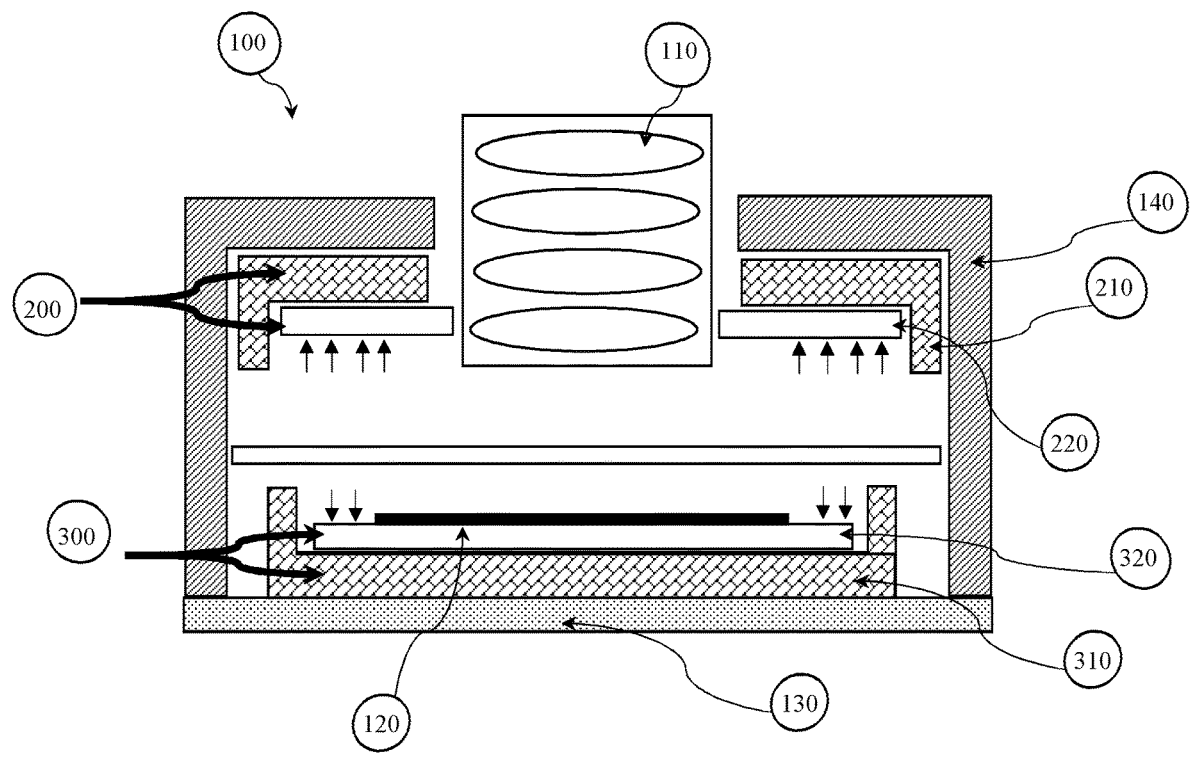
FIG. 2B shows a cross-sectional view of the OIS and AF system where two micro actuators translating the lens barrel and the image sensor along the optical z-axis to find the focus of the image.
Figure 2C:
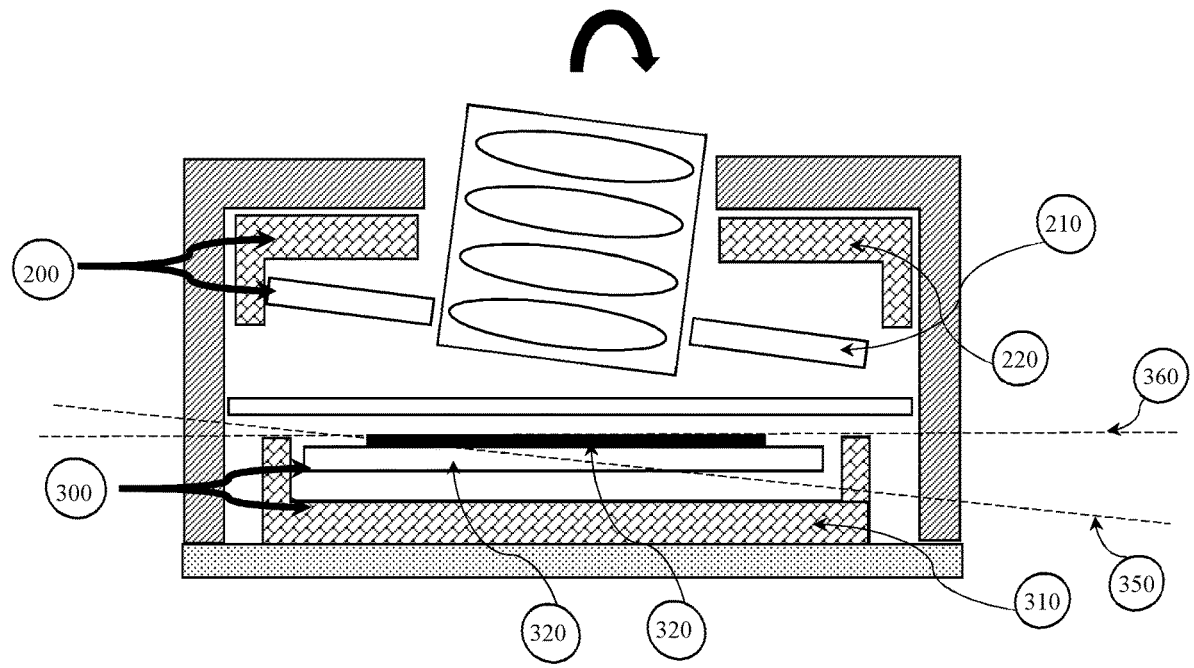
FIG. 2C shows a cross-sectional view of the OIS and AF system where the lens barrel actuator tilts the lens barrel about the x and y axis while the image sensor is not tilted.
Figure 2D:
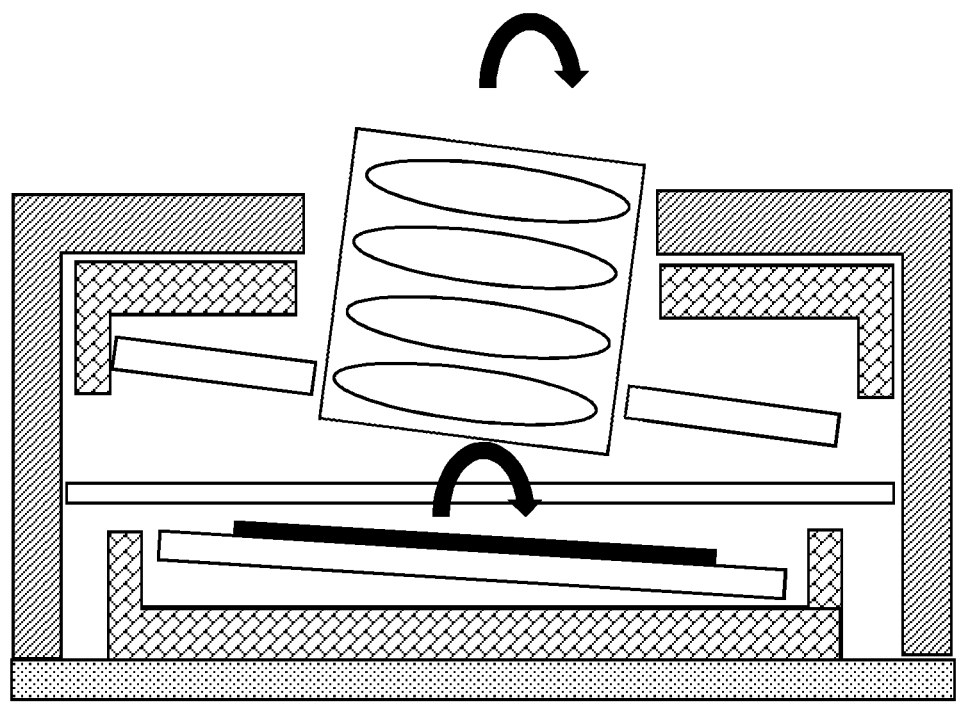
FIG. 2D shows a cross-sectional view of the OIS and AF system where two micro actuators tilting the lens barrel and the image sensor about the x and y axes.

FIG. 2A shows a camera module structure that achieves the OIS using the proposed method in the present invention. The camera module comprises a housing 140, lens barrel 110, lens barrel actuator 200, image sensor 120, image sensor actuator 300, IR filter 150 and flexible/PCB circuit 130.

Figure 3A:
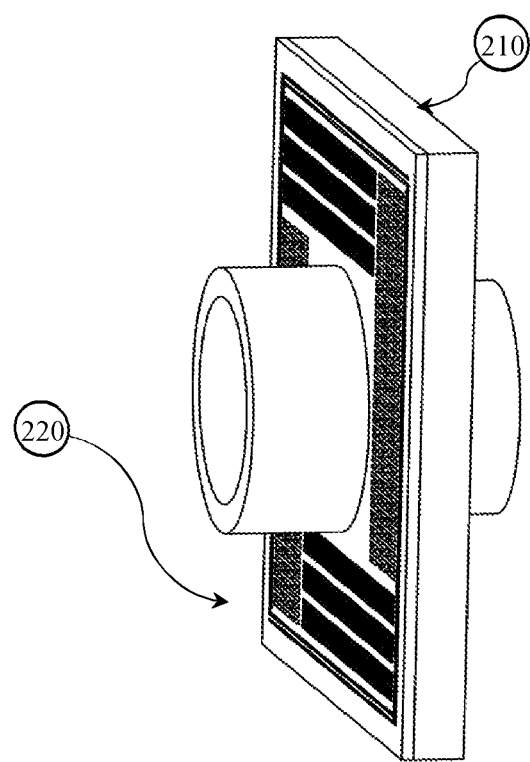
FIG. 3A shows a perspective view of the lens barrel actuator.
Figure 4:
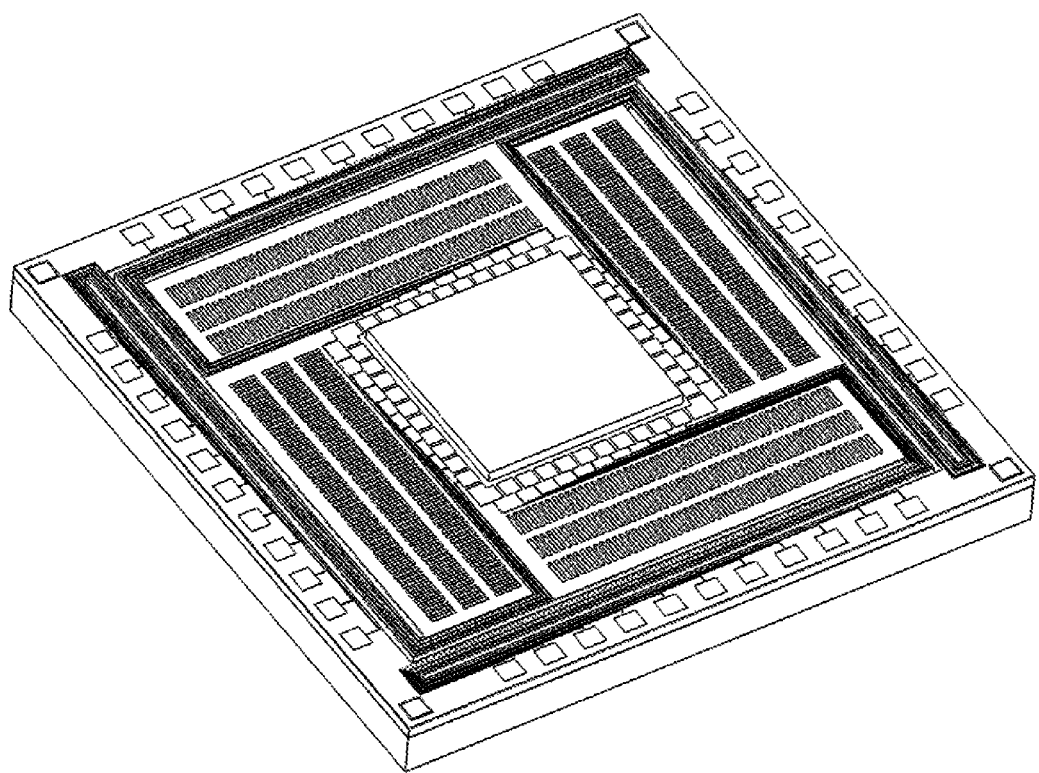
FIG. 4 shows a perspective view of the image sensor actuator.

The actuator moving the lens barrel, refer to FIG. 3A-3C, consists of two parts: moving 220 and fixed 210. The moving part consists of an arrays of openings (tubes) that surround a central through hole (for lens barrel integration) that are attached to the outer periphery of the actuator through mechanical springs. The fixed part consists of multiple arrays of pistons that are protruding vertically and are aligned with the openings in the moving part. Such actuator design is explained in detail in U.S. Pat. No. 9,306,475B1 and U.S. patent application Ser. No. 15/413,213.

The image sensor actuator also consists of two parts: moving 320 and fixed 310. It has a similar design to that of the lens barrel actuator but with no hole at the middle. The actuator is able to translate the image sensor along the z-axis to achieve AF and/or to tilt it about the x and y axes to achieve OIS.

It is apparent to one skilled in the art that the scope of the present invention not limited to the piston-tube actuator. But it could be achieved by other mechanisms of actuation such other forms of micro-electrostatic, thermal, SMA, or any other actuation method.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. An autofocus (AF) and optical image stabilization (OIS) system, comprising:

a) a first actuator to hold and move a lens barrel;
b) a second actuator to move an image sensor, wherein the second actuator is not rigidly connected to the first actuator, and wherein the first and the second actuators are independently controlled,
c) the first and the second actuators are MEMS piston-tube actuators, wherein each of said actuators provide a 3 degrees-of-freedom motion comprising of a translation along a z-axis being perpendicular to a plane of each actuator, and a bi-axial tilt about an x-axis and a y-axis being along the plane of each actuator, and wherein both of said actuators tilt about the x- and the y-axes to achieve OIS and translate along the z-axis to achieve AF, and wherein AF is achieved by moving one or both of the image sensor and the lens barrel, and the OIS is achieved by tilting the lens barrel using the lens barrel actuator around the x- and y-axes and the image sensor actuator is tilted independently around the x- and y-axes to ensure a sensor plane is rotated to coincide with an image plane.

2. The system in claim 1, further having an IR filter and a flexible/PCB circuit.

3. The system of claim 1, wherein said first actuator comprises of a moving part and a fixed part, and wherein the moving part comprises of an arrays of openings (tubes) that surround a central through hole, and are attached to an outer periphery of the first actuator through a set of mechanical springs, and wherein the fixed part comprises of a multiple arrays of pistons that are protruding vertically and are aligned with the arrays of openings in the moving part, and wherein the lens barrel is integrated at the central through hole.

4. The system of claim 1, wherein said second actuator comprises of an actuator-moving part and an actuator-fixed part, and wherein the actuator-moving part comprises of an arrays of actuator-openings (tubes) that are attached to the outer periphery of the second actuator through a set of actuator-mechanical springs, and wherein the actuator-fixed part comprises of a multiple arrays of actuator-pistons that are protruding vertically and are aligned with the arrays of actuator-openings in the actuator-moving part, and wherein the second actuator is able to translate the image sensor along the z-axis to achieve auto-focus and/or to tilt it about the x and the y axes to achieve OIS.

* * * * *